US006935002B1

(12) United States Patent
Makino et al.

(10) Patent No.: US 6,935,002 B1
(45) Date of Patent: Aug. 30, 2005

(54) METHOD OF MANUFACTURING A NONRECIPROCAL CIRCUIT DEVICE

(75) Inventors: Toshihiro Makino, Matto (JP); Akihito Masuda, Kanazawa (JP); Takashi Kawanami, Ishikawa-ken (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 09/503,388

(22) Filed: Feb. 14, 2000

Related U.S. Application Data

(62) Division of application No. 09/170,909, filed on Oct. 13, 1998, now Pat. No. 6,037,844.

(30) Foreign Application Priority Data

Oct. 13, 1997 (JP) .............................................. 9-278836
Sep. 16, 1998 (JP) .............................................. 10-261602

(51) Int. Cl.[7] .................................................. H01G 7/00

(52) U.S. Cl. ....................... 29/25.42; 29/25.41; 29/417; 29/832; 29/838; 29/840; 29/843; 333/1.1; 333/24.2

(58) Field of Search ............................ 29/25.41, 25.42, 29/412, 417, 832, 838, 840, 843, 846, 847; 333/1.1, 24.2

(56) References Cited

U.S. PATENT DOCUMENTS

| | | | | | |
|---|---|---|---|---|---|
| 3,679,942 | A | * | 7/1972 | Daly | 317/230 |
| 3,836,874 | A | * | 9/1974 | Maeda et al. | 333/1.1 |
| 4,192,698 | A | * | 3/1980 | Maher et al. | 156/89.17 |
| 4,261,086 | A | * | 4/1981 | Giachino et al. | 29/25.41 |
| 4,555,745 | A | * | 11/1985 | Westermeir et al. | 361/320 |
| 5,068,629 | A | * | 11/1991 | Nishikawa et al. | 333/1.1 |
| 5,142,437 | A | * | 8/1992 | Kammerdiner et al. | 361/313 |
| 5,211,058 | A | * | 5/1993 | Fukiura et al. | 73/724 |
| 5,223,805 | A | * | 6/1993 | Talcott et al. | 333/1.1 |
| 5,390,072 | A | * | 2/1995 | Anderson et al. | 361/313 |
| 5,397,864 | A | * | 3/1995 | Rai et al. | 174/261 |
| 5,448,445 | A | * | 9/1995 | Yamate et al. | 361/304 |
| 5,587,870 | A | * | 12/1996 | Anderson et al. | 361/313 |
| 5,685,968 | A | * | 11/1997 | Hayakawa et al. | 205/122 |
| 5,767,021 | A | * | 6/1998 | Imai et al. | 438/719 |
| 5,774,024 | A | * | 6/1998 | Marusawa et al. | 333/1.1 |
| 5,821,830 | A | * | 10/1998 | Hasegawa | 333/1.1 |
| 5,832,585 | A | * | 11/1998 | Takiar et al. | 29/424 |
| 5,838,032 | A | * | 11/1998 | Ting | 257/211 |
| 5,923,224 | A | * | 7/1999 | Makino et al. | 333/1.1 |
| 5,931,371 | A | * | 8/1999 | Pao et al. | 228/180.22 |
| 5,945,887 | A | * | 8/1999 | Makino et al. | 333/1.1 |
| 6,020,793 | A | * | 2/2000 | Makino et al. | 333/1.1 |
| 6,319,542 | B1 | * | 11/2001 | Summerfelt et al. | 427/79 |

FOREIGN PATENT DOCUMENTS

| | | | | |
|---|---|---|---|---|
| EP | 0618636 | A2 | | 10/1994 |
| EP | 07263917 | | | 10/1995 |
| EP | 02036610 | | | 2/1997 |
| EP | 0779673 | A1 | | 6/1997 |
| EP | 09213523 | | | 8/1997 |
| JP | 01096956 | A | * | 4/1989 |
| JP | 7263917 | | | 10/1995 |
| JP | 08102603 | A | * | 4/1996 |
| JP | 08335530 | A | * | 12/1996 |

* cited by examiner

*Primary Examiner*—A. Dexter Tugbang
*Assistant Examiner*—Paul Kim
(74) *Attorney, Agent, or Firm*—Keating & Bennett, LLP

(57) ABSTRACT

A method of manufacturing a nonreciprocal circuit device is performed such that matching capacitors are formed of single-board-type capacitors including capacitor electrodes formed so as to be opposed to each other on both main surfaces of a dielectric substrate with the substrate in between. An outer peripheral edge of a ground electrode (or another connected electrode), to which a capacitor electrode of the single-board-type capacitor is connected, is positioned inwardly from an outer peripheral edge of the capacitor electrode.

26 Claims, 15 Drawing Sheets

METHOD OF MANUFACTURING A NONRECIPROCAL CIRCUIT DEVICE

This is a division of application Ser. No. 09/170,909, filed Oct. 13, 1998, now U.S. Pat. No. 6,037,844.

BACKGROUND OF THE INVENTION

1. Field of the Invention

The present invention relates to a nonreciprocal circuit device, such as an isolator, a circulator, etc., for use in a microwave band.

2. Description of the Related Art

In general, lumped-constant-type isolators for use in mobile communication apparatuses, such as portable telephones, allow a transmission signal to pass only in the transmission direction and prevent transmission thereof in the reverse direction. Also, recently there has been a strong demand for mobile communication apparatuses to have a lower cost as well as a smaller size and a lighter weight to make them easier to use, and in response to this, a smaller size, lighter weight, and lower cost isolator is also in demand.

A conventional lumped-constant-type isolator has a construction in which, as shown in FIG. 20, a permanent magnet 52, a center electrode body 53, a matching circuit board 54, and a grounding plate 55 are disposed in sequence from the top between upper and lower yokes 50 and 51. The center electrode body 53 is constructed in such a way that three center electrodes 57 are placed on a circular-plate ferrite 56 so as to intersect each other in an electrically insulated state.

The matching circuit board 54 has a circular hole 54*b* through which the center electrode body 53 is inserted. The circular hole 54*b* is formed in the central portion of a dielectric substrate 54*a* in the form of a rectangular thin plate. Around the edge of the circular hole 54*b* of the dielectric substrate 54*a* capacitor electrodes 58 are formed to be connected to input/output ports P1 to P3 of each of the center electrodes 57. A termination resistance film 59 is connected to the port P3.

In this conventional matching circuit board 54, the circular hole 54*b* must be formed and each capacitor electrode 58 must be formed as a pattern on the dielectric substrate 54*a*. Therefore, processing during manufacture and handling during assembly take time and effort, presenting the problem that the costs are increased.

Also, in the conventional matching circuit board 54, portions other than the capacitor electrodes 58 cause an increase in area and an increase in weight, presenting the problem that the above-described demand for a smaller size and lighter weight isolator cannot be met. In this regard, in recent isolators, there has been a demand for reduction in weight on the order of milligrams.

Instead of the above-described matching capacitor on a matching circuit board, it is possible to employ a single-board-type capacitor wherein capacitor electrodes are formed on the entire surface of both sides of a dielectric substrate with the board in between.

This single-board-type capacitor can be manufactured merely by forming electrodes on both main surfaces of a motherboard made of a large flat plate and by cutting the motherboard to predetermined dimensions, and mass production thereof is possible. For this reason, compared to a conventional case in which circular holes and a Plurality of capacitor electrodes are formed on a dielectric substrate, processing and handling are easy, and costs can be reduced.

Also, since electrodes are formed on the entire surface of the board, a wasteful increase in area and in weight can be eliminated, and a smaller size and a lighter weight can be achieved by a corresponding amount.

FIGS. 16 to 19 show an example of an experimental unpublished isolator employing the single-board-type capacitor. In the figures, the reference 10 numerals which are the same as those of FIG. 20 indicate the same or corresponding components. This isolator is constructed such that a circular hole 61 through which a center electrode body 53 is inserted is formed on a bottom wall 60*a* of a grounding member 60 made of a resin, and single-board-type capacitors C1 to C3 and a single-board-type resistor R are disposed in such a manner as to surround the center electrode body 53 around the edge of the circular hole 61.

A grounding electrode 63 formed in the grounding member 60 is connected to a capacitor electrode 62 on the cold side (the bottom surface) of each of the single-board-type capacitors C1 to C3, and the input/output ports P1 to P3 of each center electrode 57 are connected to the capacitor electrode 62 on the hot side (the top surface).

Here the cold side means one side of a capacitor to be connected to a grounding electrode and the hot side means another side of the capacitor to be connected to a port electrode (i.e., a signal line.)

In the single-board-type capacitors C1 to C3, the capacitor electrode 62 is positioned up to an edge 64*a* of a dielectric substrate 64 as shown in FIG. 19. When the entire surface of the capacitor electrode 62 is soldered and connected to the grounding electrode 63, thermal stress due to a difference in the thermal expansion coefficients between the dielectric substrate 64 and the grounding electrode 63 is likely to concentrate in the capacitor electrode 62 at the portion near this edge 64*a* and then may cause the capacitor electrode 62 to be peeled off.

When, in particular, the capacitor is employed in an isolator, heat is generated during transmission as 10 a result of insertion loss and consumption of reflected power at the termination resistor. Further, when the motherboard is cut, very small cracks are likely to be generated in the vicinity of the end surface of the capacitor. This also may cause the electrode peeling. During reception, on the other hand, when the capacitor is subjected to a thermal cycle, such as by being cooled again, the problem with electrode peeling is likely to occur.

SUMMARY OF THE INVENTION

A feature of the present invention, which has been achieved in view of the above-described circumstances, is to provide a connection structure for a single-board-type capacitor which is capable of avoiding the problem of electrode peeling.

To achieve this result, according to the present invention, a nonreciprocal circuit device, having small attenuation in the direction of signal transmission and large attenuation in the reverse direction, has matching capacitors disposed in series with signal input/output ports, the matching capacitors being single-board-type capacitors including capacitor electrodes formed opposed to each other on both entire main surfaces of a dielectric substrate with the board in between, and at least a part of the outer peripheral edge of a connected electrode, to which the cold side of the single-board-type capacitor is connected, is positioned inwardly from the outer Peripheral edge of the capacitor electrode. The connected electrode can include a grounding electrode or an input/output port electrode, for example.

Also, or alternatively, it is preferable for at least a part of the outer peripheral edge of a connected electrode which is to be connected to the hot side of the capacitor, to be positioned inwardly from the outer peripheral edge of the capacitor electrode.

According to one aspect of the invention, the is outer peripheral edge of the connected electrode is positioned inwardly from the outer peripheral edge of the capacitor electrode around the entire periphery of the connected electrode.

According to another aspect of the invention, the capacitor electrode and the connected electrode are formed rectangular in shape, and the long-side edge of the connected electrode is positioned inwardly from the long-side edge of the capacitor electrode.

Alternatively, a part of the long-side edge of the connected electrode is extended up to the long-side edge of the capacitor electrode.

According to another aspect of the invention, a non-connected section surrounding the connected electrode is covered with an insulating film made from an insulating material so as to be electrically insulated from the outer peripheral edge of the capacitor electrode.

Preferably, the insulating film is made from a resin.

Preferably, the insulating film is formed by printing a resin.

According to another aspect of the invention, the insulating film surrounding the connected electrode is formed as a base upon which the connected electrode is formed.

According to another aspect of the invention, the non-connected section outside the connected electrode is provided by a step-down portion which is spaced away from the outer peripheral edge of the capacitor electrode.

In the nonreciprocal circuit device, according to another aspect of the invention, at least a part of the outer peripheral edge of the capacitor electrode is formed so as to be positioned inwardly from the outer peripheral edge of the dielectric substrate of the single-board-type capacitor.

Preferably, the capacitor electrode is formed by printing.

The non-connected section surrounding the capacitor electrode may be formed by etching to remove at least a part of the outer peripheral edge of the previously formed capacitor electrode.

Preferably, a single-board-type capacitor may be manufactured by pattern-forming electrodes on both main surfaces of a dielectric motherboard, which are opposed each other with the motherboard in between, and cutting the motherboard to predetermined dimensions.

Preferably, a single-board-type capacitor and a grounding member with the connected electrode formed thereon are assembled integrally and electrically connected with each other.

Preferably, the thickness of the dielectric board of the single-board-type capacitor is 0.5 mm or less.

Preferably, the thickness of the capacitor electrode of the single-board-type capacitor is 0.05 mm or less.

The above and further objects, aspects and novel features of the invention will become more apparent from the following detailed description when read in connection with the accompanying drawings.

DESCRIPTION OF PREFERRED EMBODIMENTS OF THE INVENTION

Embodiments of the present invention will be described below with reference to the accompanying drawings.

Figure 1:
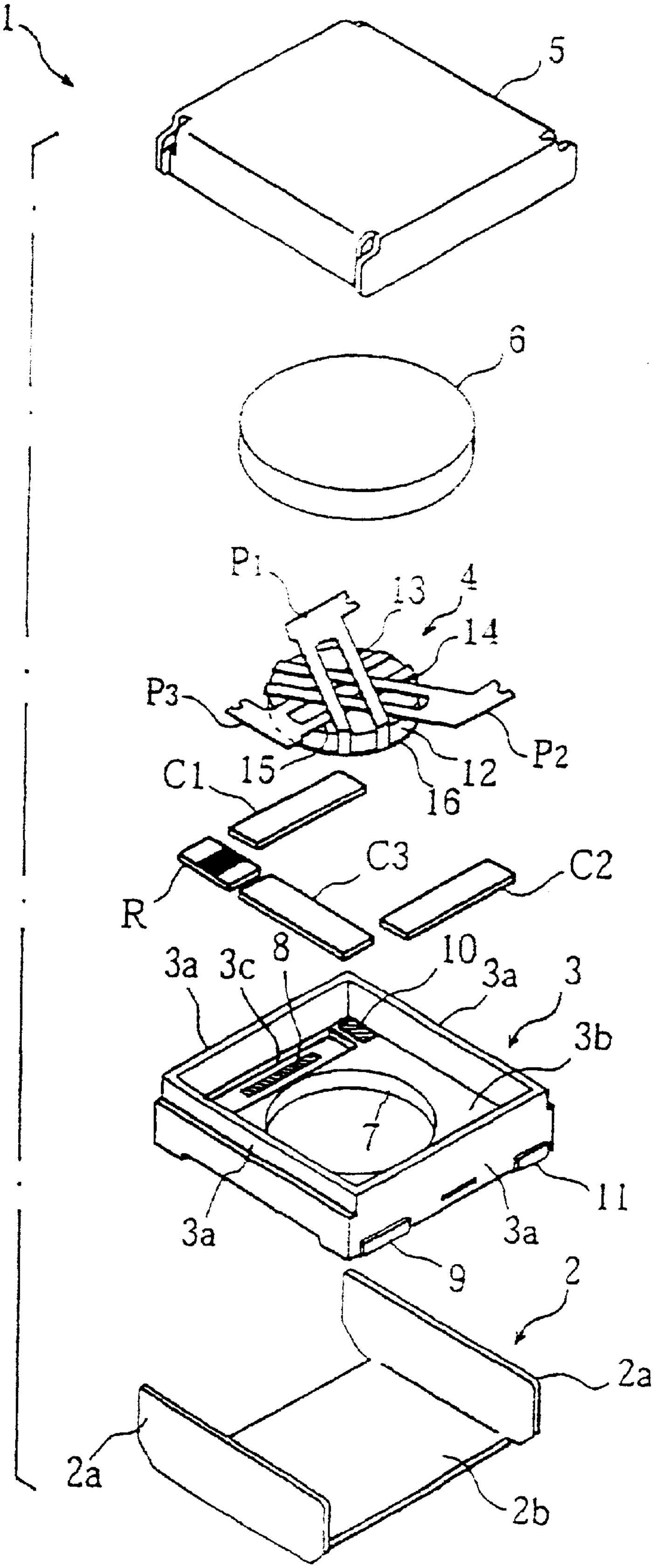
FIG. 1 is an exploded, perspective view illustrating a lumped constant-type isolator according to a first embodiment of the present invention.
Figure 2A:
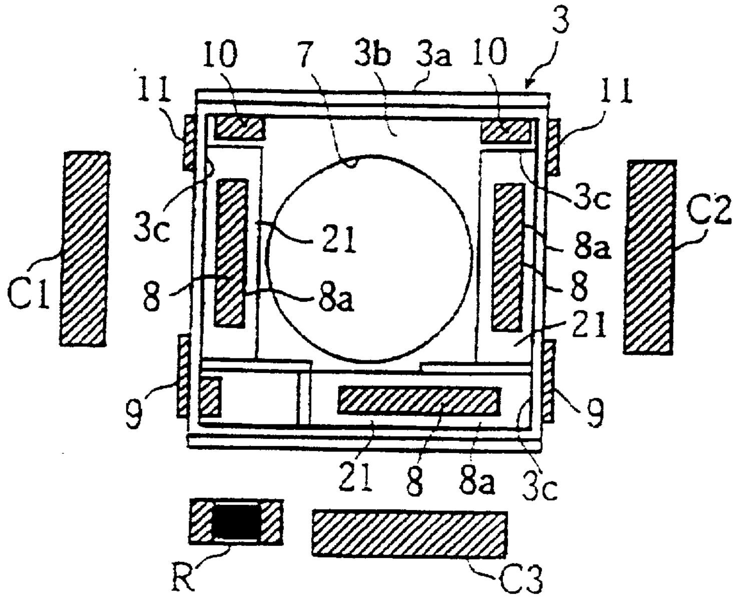
FIGS. 2A, 2B, and 2C are views showing a grounding member of the isolator of FIG. 1.
Figure 2B:
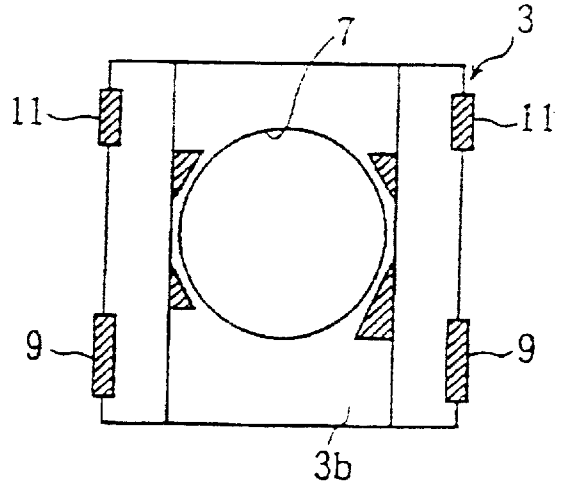
Figure 2C:
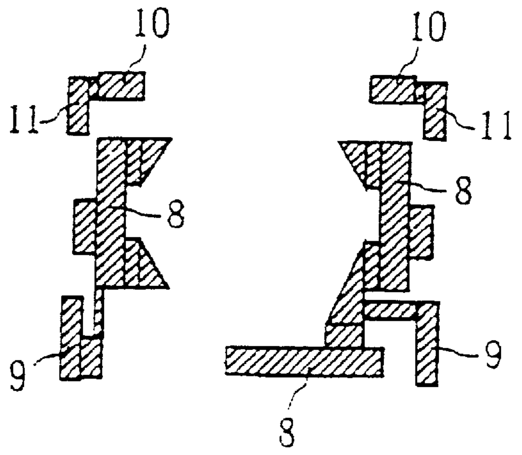
Figure 3:
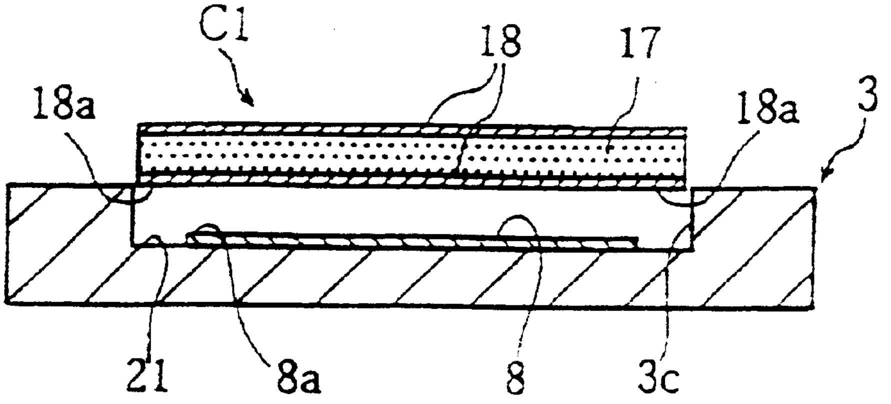
FIG. 3 is a view showing connections of the grounding member on the cold side of a single-board-type capacitor.
Figure 4:
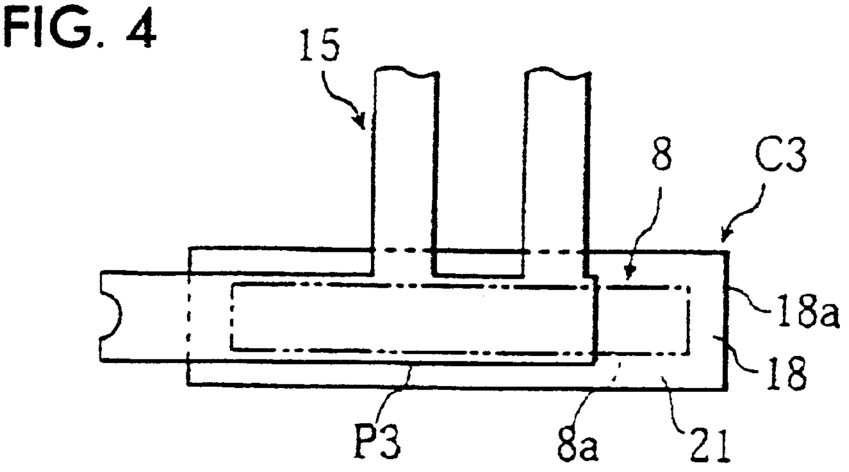
FIG. 4 is a plan view showing connections on the hot side of the single-board-type capacitor.
Figure 5:
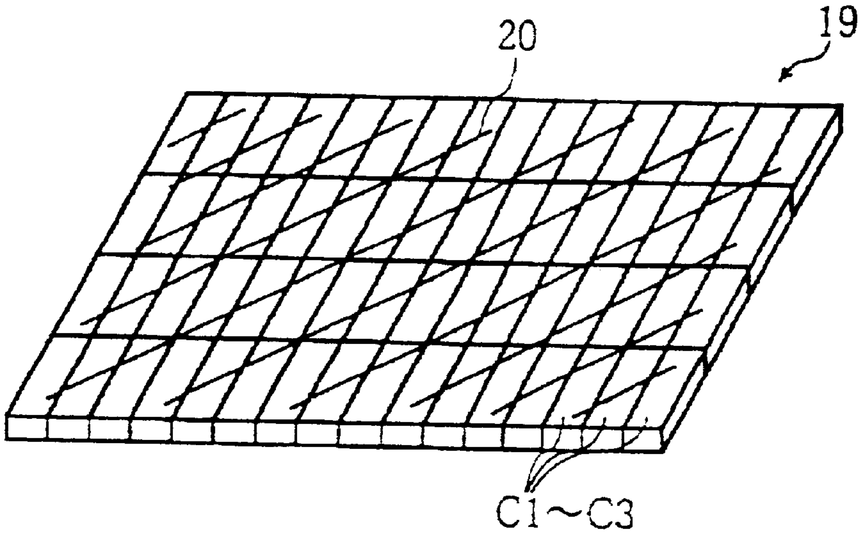
FIG. 5 is a view showing a method of manufacturing the single-board-type capacitor.

FIGS. 1 to 5 are views illustrating a lumped-constant-type isolator according a first embodiment of the present invention. FIG. 1 is an exploded, perspective view showing a single-board-type capacitor. FIGS. 2A to 2C are respectively a top plan view and a bottom plan view of a grounding member, and a see-through view of an electrode pattern. FIGS. 3 and 4 are respectively a sectional view and a plan view showing connections to a single-board-type capacitor. FIG. 5 is a view showing a method of manufacturing a single-board-type capacitor.

A lumped-constant-type isolator 1 of this embodiment is constructed in such a way that a resin grounding member 3 is disposed in a magnetic metal lower yoke 2 having right and left side walls 2*a*, and a bottom wall 2*b*; a center electrode assembly 4 is placed in the grounding member 3; and a box-shaped upper yoke 5 similarly made of a magnetic metal is mounted in the lower yoke 2, forming a magnetic closed circuit. Also, a circular-shaped permanent magnet 6 is attached onto the inner surface of the upper yoke 5, so that a DC magnetic field is applied to the center electrode assembly 4 by the permanent magnet 6.

The isolator 1 is a rectangular-parallelepiped in shape, having outer plane dimensions 7.5×7.5 mm or less and a height of 2.5 mm or less, and is surface-mounted and connected to conductive lines on a circuit board (not shown).

The center electrode assembly 4 is of a construction in which three center electrodes 13 to 15 are placed on the top surface of a circular-plate-shaped ferrite 12 in such a manner as to intersect each other with an angle of 120 degrees while being electrically insulated from each other. The input/output ports P1 to P3 at respective ends of each of the center electrodes 13 to 15 are made to project outwards. A shield section 16 connected in common to each of the other ends of the center electrodes 13 to 15 is brought into abutment with the bottom surface of the ferrite 12, and the shield section 16 is connected to the bottom wall 2*b* of the lower yoke 2.

The grounding member 3 has a construction in which a bottom wall 3*b* is integrally formed with side walls 3*a* in the shape of a rectangular frame. A circular hole 7 through which the center electrode assembly 4 is inserted is formed in the central portion of the bottom wall 3*b*. Capacitor positioning recesses 3*c* are each provided around the edge of the circular hole 7 of this bottom wall 3*b*, and a grounding electrode 8 is formed in the bottom surface of each recess 3*c*. Each of these grounding electrodes 8 is connected to grounding terminals 9 formed on the outer surfaces of the right and left side walls 3*a*.

Input/output port electrodes 10 are respectively formed on the right and left upper end portions of the bottom wall 3*b*, and each of the port electrodes 10 is connected to a respective one of the input/output terminal 11 formed on the outer surfaces of the right and left side walls 3*a*. Each of the grounding terminals 9 and input/output terminals 11 is disposed for being surface-mounted onto a line of a circuit board (not shown).

The single-board-type matching capacitors C1 to C3 are housed and disposed inside each of the positioning recesses 3*c*. Also, a termination resistor R is placed in parallel with the single-board-type matching capacitor C3 inside the lower-edge positioning recess 3*c*, and the termination resistor R is connected to the grounding terminal 9.

As shown in FIG. 3, each of the single-board-type matching capacitors C1 to C3 is of a construction in which capacitor electrodes 18 are formed on the entire surface of both main surfaces of a rectangular thin-plate-shaped dielectric substrate 17 in such a manner as to be opposed to each other with the substrate 17 in between. Also, as shown in FIG. 5, each of the single-board-type matching capacitors C1 to C3 is manufactured by pattern-forming a silver thick-film electrode 20 on both surfaces of a large, flat motherboard 19, by a method such as printing, plating, contact bonding, or vapor deposition, and by cutting the motherboard 19 into predetermined dimensions.

The capacitor electrode 18 on the cold side of each of the single-board-type matching capacitors C1 to C3 is soldered and thereby electrically connected to a respective one of the grounding electrodes 8. Each of the grounding electrodes 8 is formed smaller than the corresponding capacitor electrode 18 in such a manner as to be positioned inwardly from an outer peripheral edge 18*a* of the capacitor electrode 18 around the entire outer peripheral edge 8*a* of the grounding electrode 8. Thus there is an cuter peripheral section 21, surrounding the Grounding electrode 8 to which the capacitor electrode 18 is not connected.

FIG. 4 is an exemplary magnified diagram showing input/output port P3 connected to the capacitor electrode 18 on the hot side of capacitor C3 and showing the capacitor electrode 18 on the cold side of capacitor C3 connected to grounding electrode 8. More generally, each of the input/output ports P1 to P3 of the center electrodes 13 to 15 is formed so as to be positioned inwardly from an outer peripheral edge 18*a* of the capacitor electrode 18 of the corresponding single-board-type matching capacitor C1 to C3. Each of the input/output ports P1 to P3 is soldered and connected to the capacitor electrode 18 on the hot side. The tip portions of the two input/output ports P1 and P2 are connected to the input/output port electrodes 10, and the tip portion of the remaining port P3 is connected to the termination resistor R.

Next, the operational effect of this embodiment will be described.

According to the lumped-constant-type isolator of this embodiment, since the outer peripheral edge 8a of the grounding electrode 8 to which the capacitor electrode 18 of each of the single-board-type matching capacitors C1 to C3 is connected, and the input/output ports P1 to P3 are formed small enough to be positioned inwardly from the outer peripheral edge 18*a* of the corresponding capacitor electrode 18, electrode peeling in the edge portion of the capacitor electrode 18, which could cause cracks to occur due to stress concentration and the manufacturing process can be prevented, and reliability with respect to quality can be improved.

Since the edge portions of the capacitor electrodes 18 are not connected, even if thermal stress occurs due to the difference in the thermal expansion coefficients among the dielectric substrates 17, the grounding electrodes 8, and the center electrodes 13 to electrode peeling does not occur. As a result, even if repeated thermal cycling of the isolator 1 occurs during transmitting and receiving, the problem with electrode peeling can be solved, and also from this point of view, reliability with respect to quality can be improved.

In this embodiment, since the single-board-type matching capacitors C1 to C3 are employed, as described above, manufacturing becomes easy and mass production is possible, making it possible to reduce the cost of parts. Also, compared to a conventional case in which circular holes and capacitor electrodes are formed, processing and handling are easy, and a wasteful increase in area and in weight can be eliminated, contributing to a smaller size and a lighter weight.

FIGS. 6 to 15 are views illustrating lumped-constant-type isolators according to additional embodiments of the present invention. In the figures, the reference numerals which are the same as those of FIGS. 2 to 4 indicate the same or corresponding components.

Figure 6:
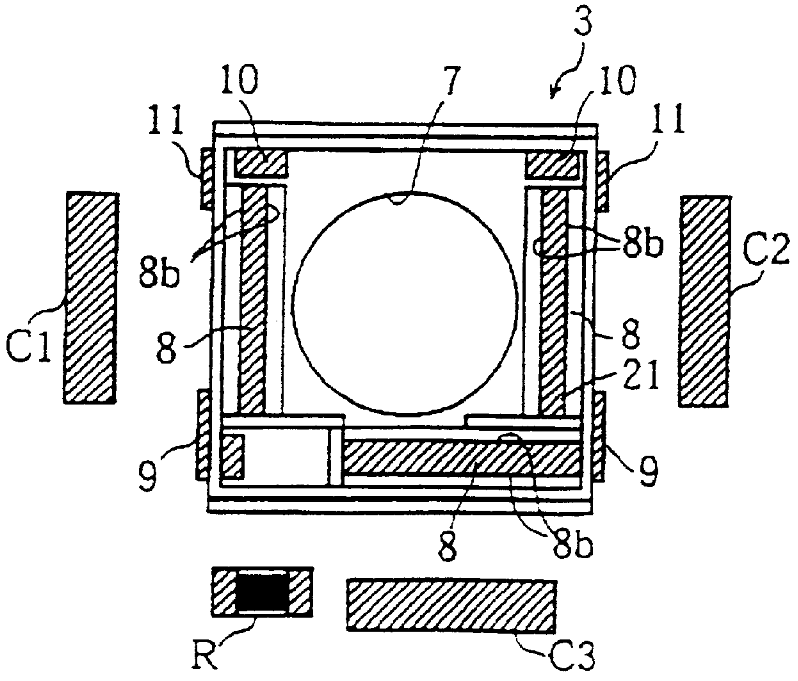
FIG. 6 is an exploded, plan view showing an isolator according to a second embodiment of the present invention.

FIG. 6 shows a second embodiment of the present invention. This embodiment is constructed such that only the two long-side edges 8*b* of the rectangular grounding electrode 8 are formed in such a manner as to be positioned inwardly from the corresponding two long-side edges of the capacitor electrode 18.

In this embodiment, since the long-side edges 8*b* of the grounding electrode 8 are positioned inwardly from the capacitor electrode 18, electrode peeling in the transverse direction, in which electrode peeling is likely to occur, can be prevented, and the grounding electrode 8 can be extended in the longitudinal direction. Also, since the long side of the grounding electrode 8 can be lengthened, a single-board-type capacitor of a different length can be used.

Figure 7:
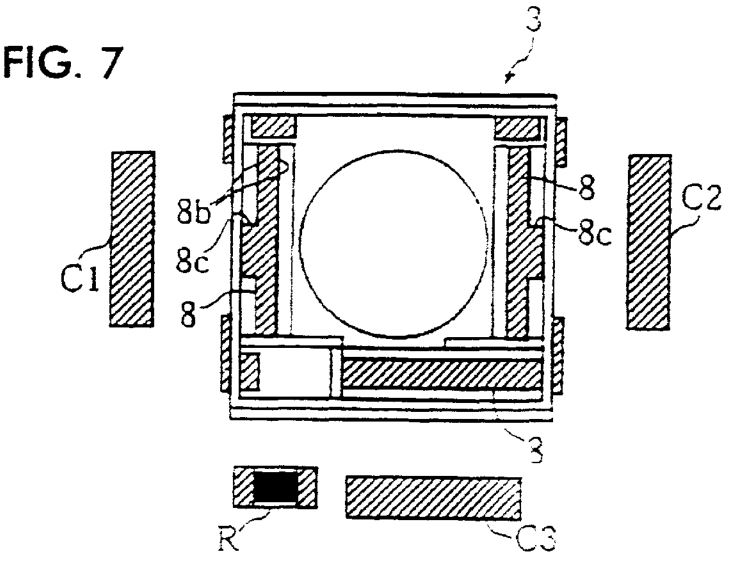
FIG. 7 is an exploded, plan view showing an isolator according to a third embodiment of the present invention.

FIG. 7 shows a third embodiment of the present invention. This embodiment is constructed such that the two long-side edges 8*b* of a grounding electrode 8 are positioned inwardly from the corresponding two long-side edges of a grounding electrode 18, except that a central portion 8*c* along the longitudinal direction of one long-side edge 8*b* is extended and formed up to the edge of the capacitor electrode 18. In this embodiment as well, which prevents electrode peeling in the transverse direction in which electrode peeling is likely to occur, the electrode area can be increased.

Figure 8:
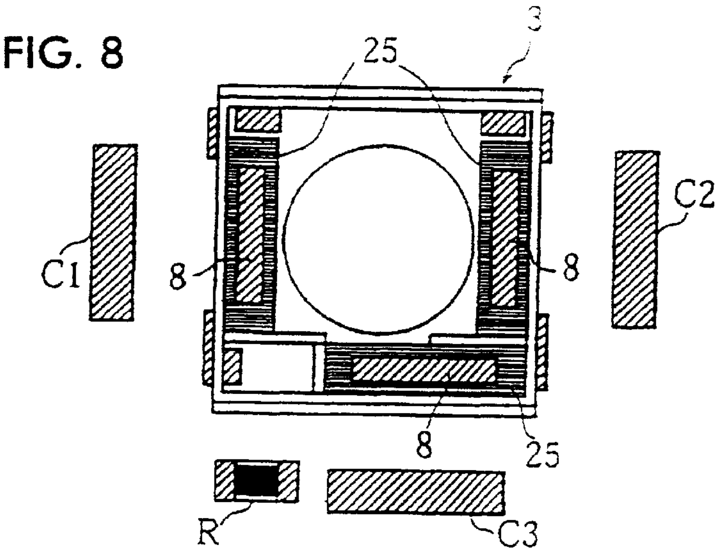
FIG. 8 is an exploded, plan view showing an isolator according to a fourth embodiment of the present invention.
Figure 9:
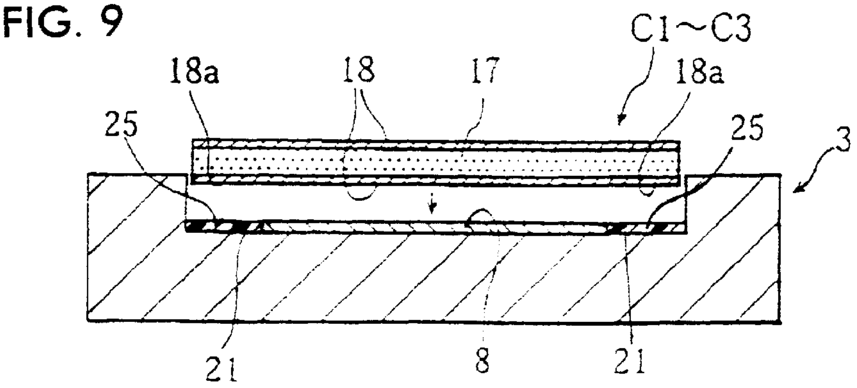
FIG. 9 is a view showing connections of a single-board-type capacitor of the isolator of FIG. 8.

FIGS. 8 and 9 show a fourth embodiment of the present invention. This embodiment is constructed such that an insulating film 25 is coated and formed on the outer peripheral section 21 surrounding each grounding electrode 8 by printing an insulating resin, and an outer peripheral edge 18*a* of a capacitor electrode 18 of each of the single-board-type matching capacitors C1 to C3 is brought into contact with this insulating film 25.

The insulating film 25 is not limited to a resin, and other insulating materials can be used as well.

In this embodiment, since the insulating film formed by a resin is coated onto the outer peripheral section 21, insulation of the outer peripheral edge 18*a* of the capacitor electrode 18 can be reliably ensured, making it possible to further prevent electrode peeling. This makes it possible co decrease grounding impedance of the isolator 1, to reduce unwanted radiation by an amount corresponding to the decrease in insertion loss, and to improve harmonic wave elimination capability, leading to higher performance when the isolator is employed in a communication apparatus, and to more stable operation.

Figure 10:
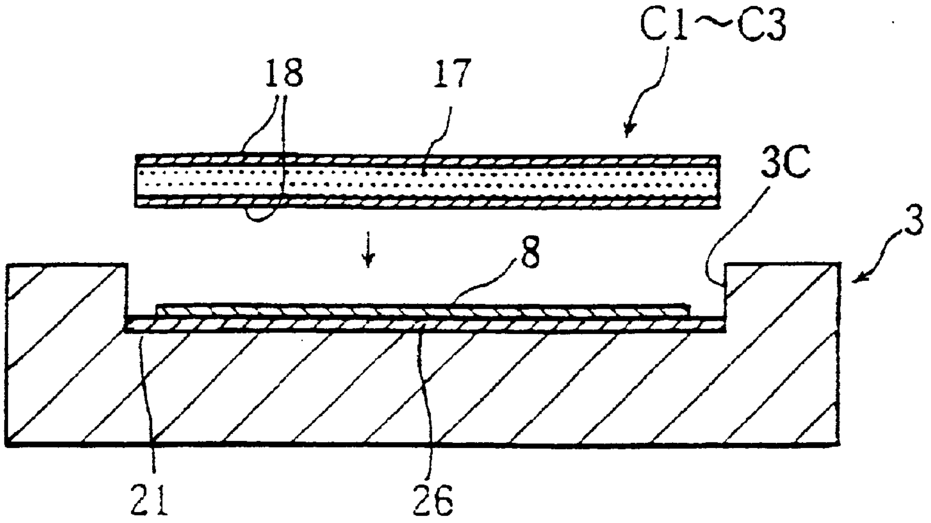
FIG. 10 is a view showing an isolator according to a fifth embodiment of the present invention.

FIG. 10 shows a lumped-constant-type isolator according to a fifth embodiment of the present invention. This isolator is constructed such that a solder-dewetting film 26 is coated and formed on the entire bottom surface of the housing recess 3*c*, and grounding electrode 8 is formed over the solder-dewetting film 26. Stainless steel may be employed for this solder-dewetting film 26, and gold plating is preferably employed for the grounding electrode 8.

In this embodiment, the solder-dewetting film 26 forms a base for the grounding electrode 8, and outer peripheral portions of the solder-dewetting film 26 surround the grounding electrode 8. Therefore, the formation of the solder-dewetting film 26 is easy even in a case in which the shape of the grounding electrode 8 becomes complex, and, as in the embodiment described above, electrode peeling can be reliably prevented, unwanted radiation can be reduced, and harmonic wave elimination performance can be improved.

Figure 11:
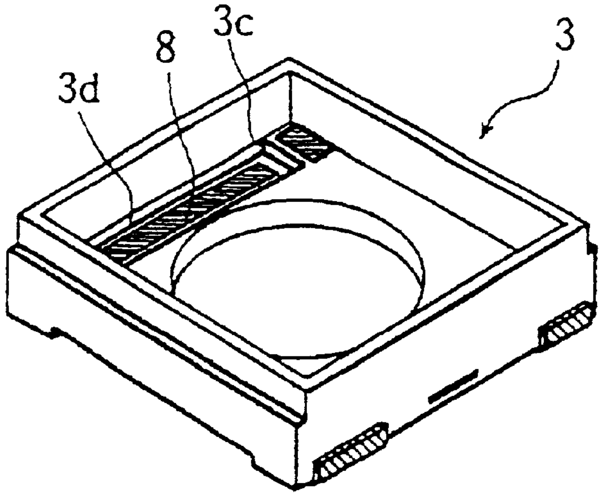
FIG. 11 is a perspective view showing an isolator according to a sixth embodiment of the present invention.
Figure 12:
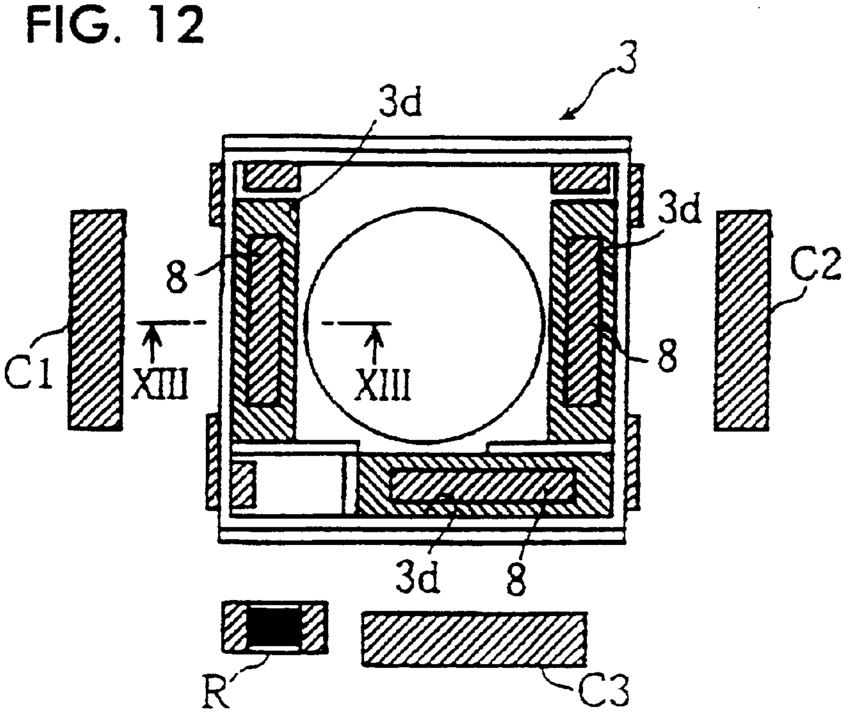
FIG. 12 is an exploded, plan view of the isolator of FIG. 11.
Figure 13:
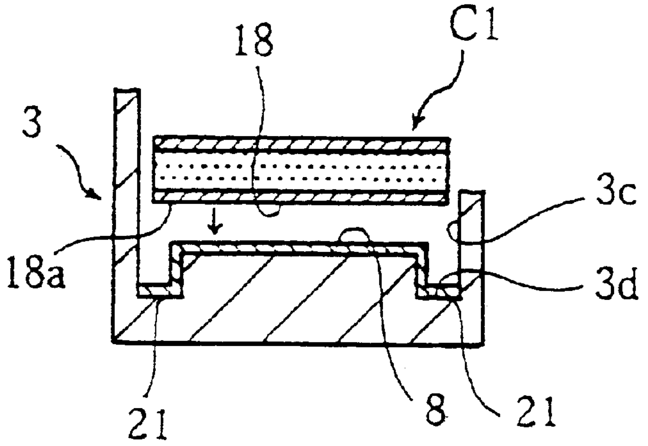
FIG. 13 is a view showing connections of the isolator of FIG. 11.

FIGS. 11 to 13 show a lumped-constant-type isolator according to a sixth embodiment of the present invention. This isolator is constructed with a step-down section 3*d* formed so as to define the outer peripheral section 21 of the recess 3*c* of the grounding member 3 in such a manner that the outer peripheral section 21 is spaced away from the outer peripheral edge 18*a* of a capacitor electrode 18.

In this embodiment, the outer peripheral edge 8a of the capacitor electrode 18 does not come into contact, making it possible to prevent electrode peeling, even with the step-down section 3*d* in a case in which the grounding electrode 8 is formed on the entire surface inside the recess 3*c*.

Figure 14:
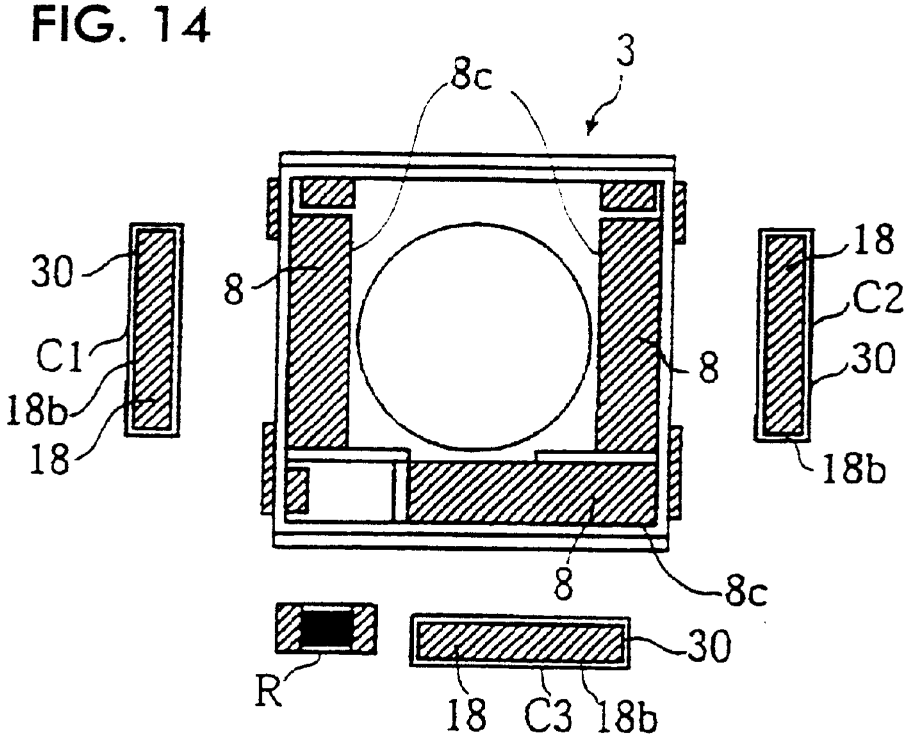
FIG. 14 is an exploded, plan view of the isolator according to a seventh embodiment of the present invention.
Figure 15:
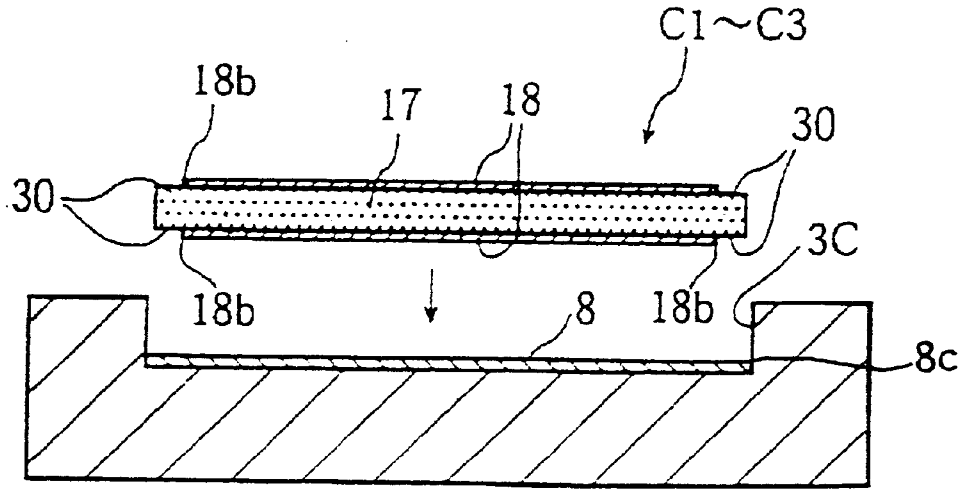
FIG. 15 is a view showing connections of the isolator of FIG. 14.
Figure 16:
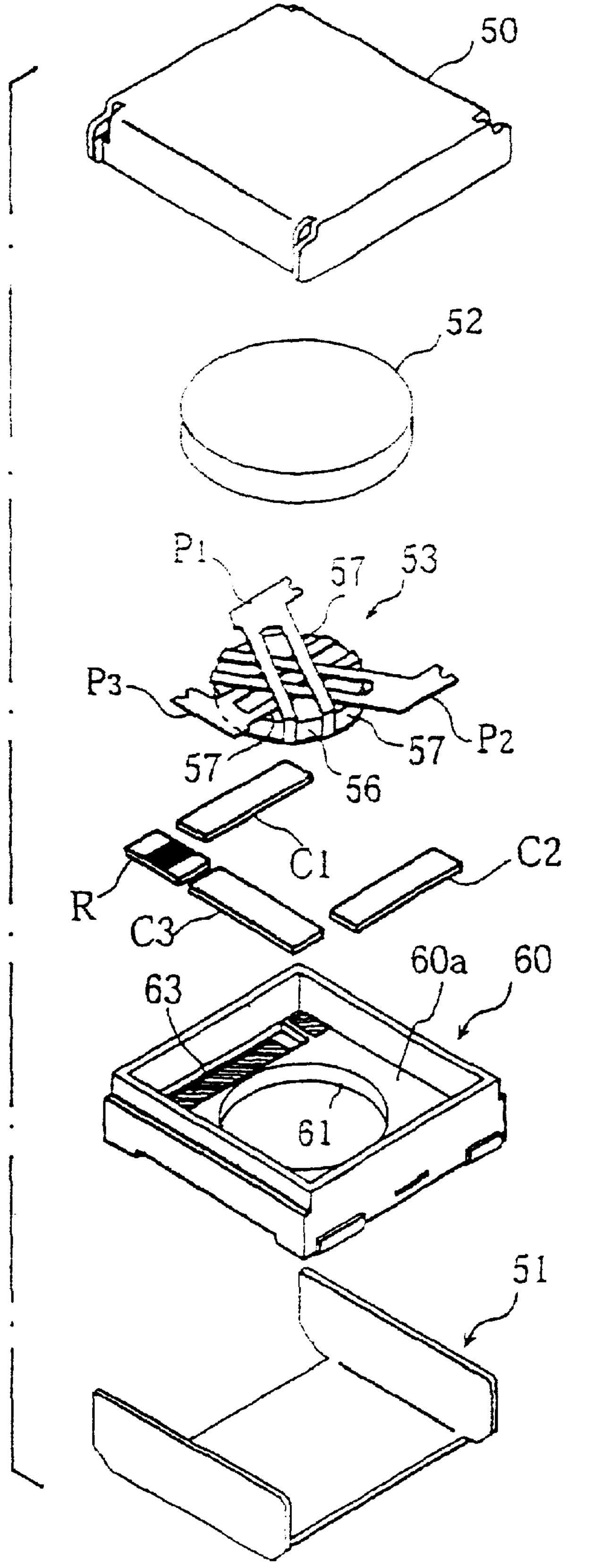
FIG. 16 is an exploded, perspective view illustrating an experimental unpublished isolator.
Figure 17:
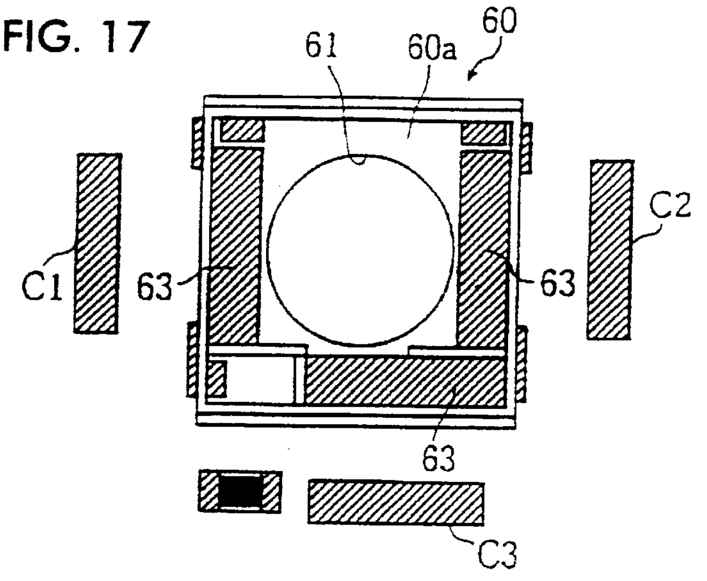
FIG. 17 is an exploded, plan view showing a single-board-type capacitor in the isolator of FIG. 16.
Figure 18:
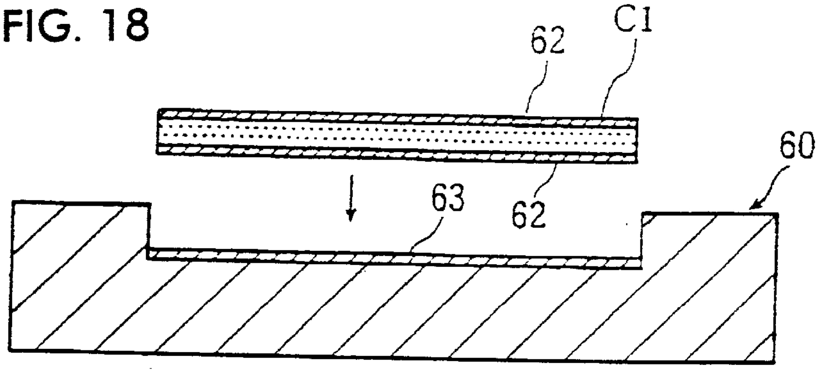
FIG. 18 is a view snowing connections in the isolator of FIG. 16.
Figure 19:
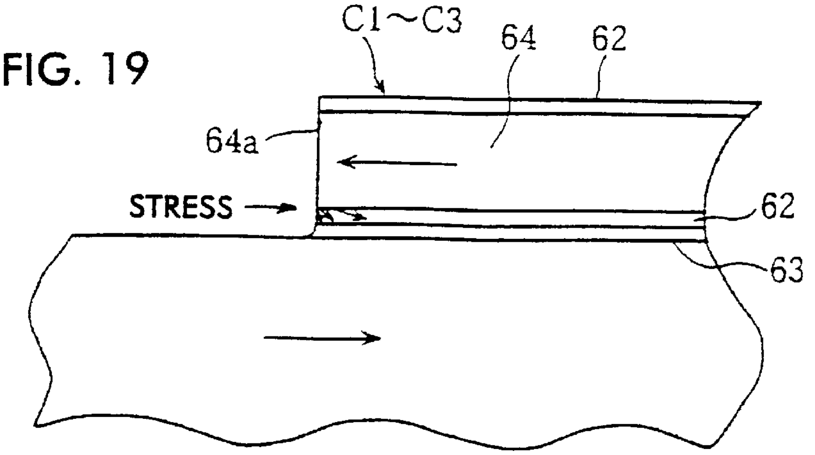
FIG. 19 is a view showing electrode peeling in the single-board-type capacitor of FIG. 17.
Figure 20:
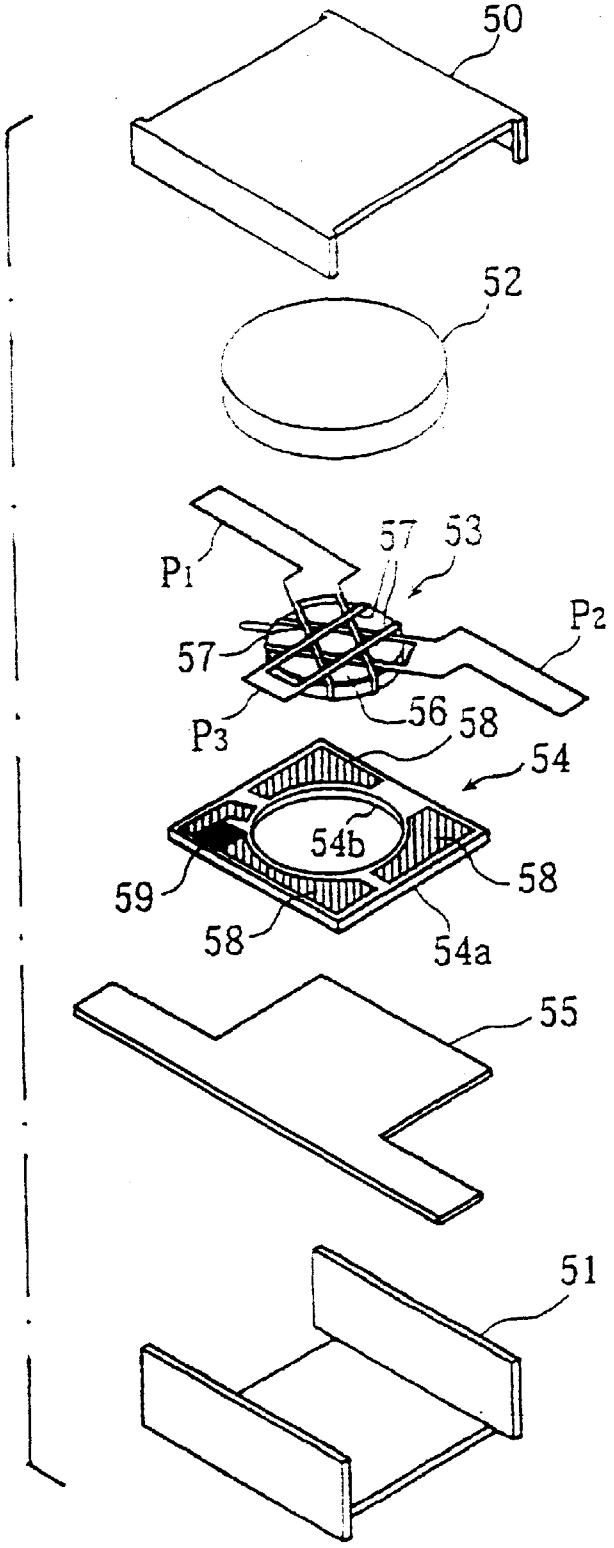
FIG. 20 PRIOR ART
FIG. 20 is an exploded, perspective view showing a conventional isolator.

FIGS. 14 and 15 show a lumped-constant-type isolator according to a seventh embodiment of the present invention. This isolator is constructed with a non-connected section 30 formed around the outer peripheral edge of the dielectric substrate 17 of each of the single-board-type matching capacitors C1 to C3. The non-connected section 30 defines a portion of the dielectric substrate 17 which is exposed and has no capacitor electrode formed thereon. As a result,-the outer peripheral edge 18*b* of the capacitor electrode 18 is positioned inwardly from the outer peripheral edge 8*c* of the grounding electrode 8. This non-connected section 30 can be realized by printing the capacitor electrode 18 on a portion of the dielectric substrate 17 excluding the non-connected section 30, or by removing, by etching, the outer peripheral edge of the electrode which has been previously formed on the entire surface of the dielectric substrate 17.

In this embodiment, since the non-connected section 30 is formed around the outer peripheral edge of the dielectric substrate 17 of each of the single-board-type matching capacitors C1 to C3, and since no electrodes are disposed in the edge portion of the dielectric substrate 17 where cracks are likely to occur due to stress concentration and during manufacture, it is possible to prevent electrode peeling in the edge portion and to improve reliability with respect to quality.

EXAMPLE

Next, a description will be given of an isolator according to an experimental example of the present invention. A feature of the isolator of this embodiment is that the thickness of a dielectric substrate 17 of each of the above-described single-board-type capacitors C1, C2, and C3 is 0.5 mm or less, and that the film thickness of a capacitor electrode 18 is 0.05 mm or less (see FIGS. 3, 9, 10, 13, and 15).

Since the thickness of the dielectric substrate 7 of each of the single-board-type capacitors C1, C2, and C3 is 0.5 mm or less, it is possible to form the single-board-type capacitors C1, C2, and C3 into a smaller size and a thinner shape without causing electrode peeling, thereby contributing to an even smaller size of the isolator. In this regard, in a conventional case in which the entire surface of the electrode is soldered, in order to obtain a required capacitance value while preventing electrode peeling, the thickness of the dielectric substrate must be, for example, 1 mm or more, presenting the problem that the capacitor becomes larger.

Furthermore, as a result of the film thickness of the capacitor electrode 18 of each of the single-board-type capacitors C1, C2, and C3 being set to 0.05 mm or less, the problem of electrode peeling when the thickness of the dielectric substrate 17 is 0.5 mm or less can be prevented more reliably.

The heat cycle tests carried out to confirm the advantages of the above-described embodiments will be described below with reference to FIGS. 21 to 26.

Test 1

Figure 21:
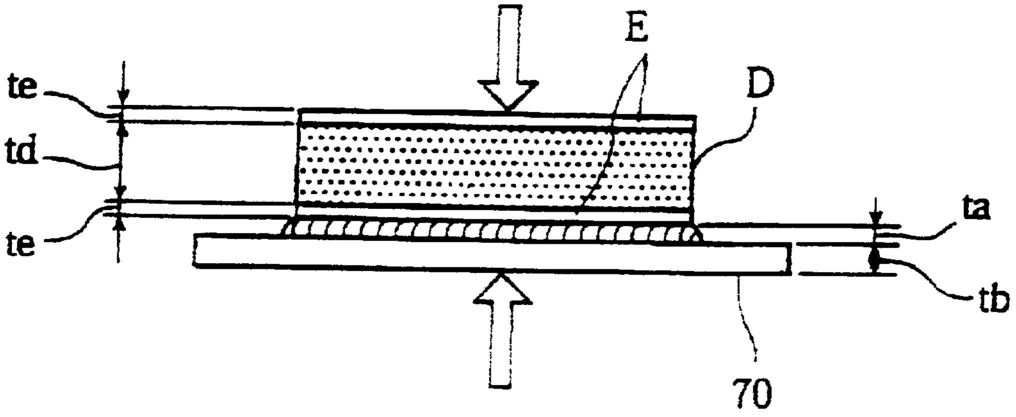
FIG. 21 is a view illustrating test 1 carried out to confirm the advantages of a single-board-type capacitor of an embodiment of the present invention.

In this test 1, as shown in FIG. 21, a single-board-type capacitor was used, in which the thickness td of the dielectric substrate D was varied, the entire surface of a capacitor electrode E on one side of the single-board-type capacitor was soldered and connected to a Cu board 70, and a heat cycle test was carried out in this state. In this test, also, the change rate of the electrostatic capacitance value between the capacitor electrode E on the non-soldered side and the Cu board 70 was checked (see the - marks in FIG. 21).

The thicknesses td of the respective dielectric substrate D were 0.1, 0.2, 0.5, and 1.0 mm. For the capacitor electrode E, an Ag thick film electrode was used, and the film thickness of the electrode E was 0.02 mm. The solder thickness ta for connecting was 0.01 to 0.02 mm, and the thickness of the Cu board 70 was 0.2 mm.

Test 2

Figure 22A:
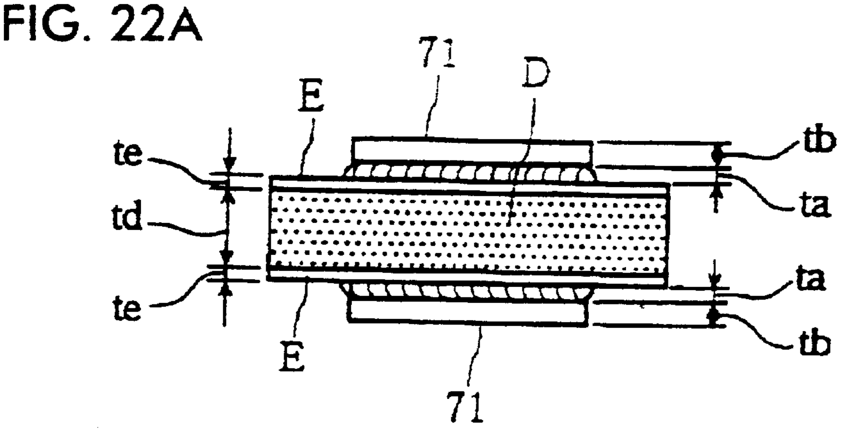
FIGS. 22A and 22B are views illustrating test 2 carried out to confirm the advantages of the invention.
Figure 22B:
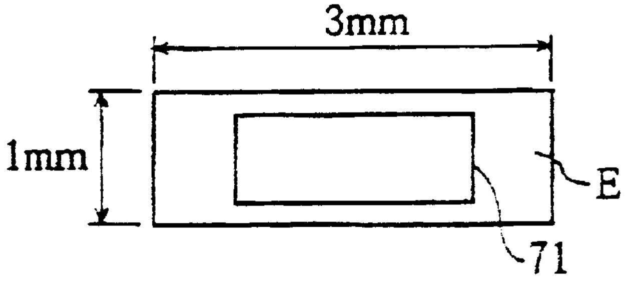

In this test 2, as shown in FIGS. 22A and 22B, a single-board-type capacitor was used, in which the film thickness te of the capacitor electrode E was varied, Cu boards 71 were soldered and connected to both sides of the capacitor electrode E of the single-board-type capacitor in such a manner as to be positioned inwardly from the outer peripheral edge of the capacitor electrode E, and a heat cycle test was carried out in this state, and the change rate of the electrostatic capacitance value was checked in the same way as in test 1 described above. Single-board-type capacitors each having a size of length 3 mm×width 1 mm were used (see the plan view of FIG. 22B).

The film thicknesses te of the respective capacitor electrodes E were 0.005, 0.01, 0.02, 0.05, and 0.1 mm. The thickness td of the dielectric board D was 0.2 mm. The solder thickness ta for connecting, and the thickness tb of the Cu board 71 were the same as in test described above.

Figure 23:
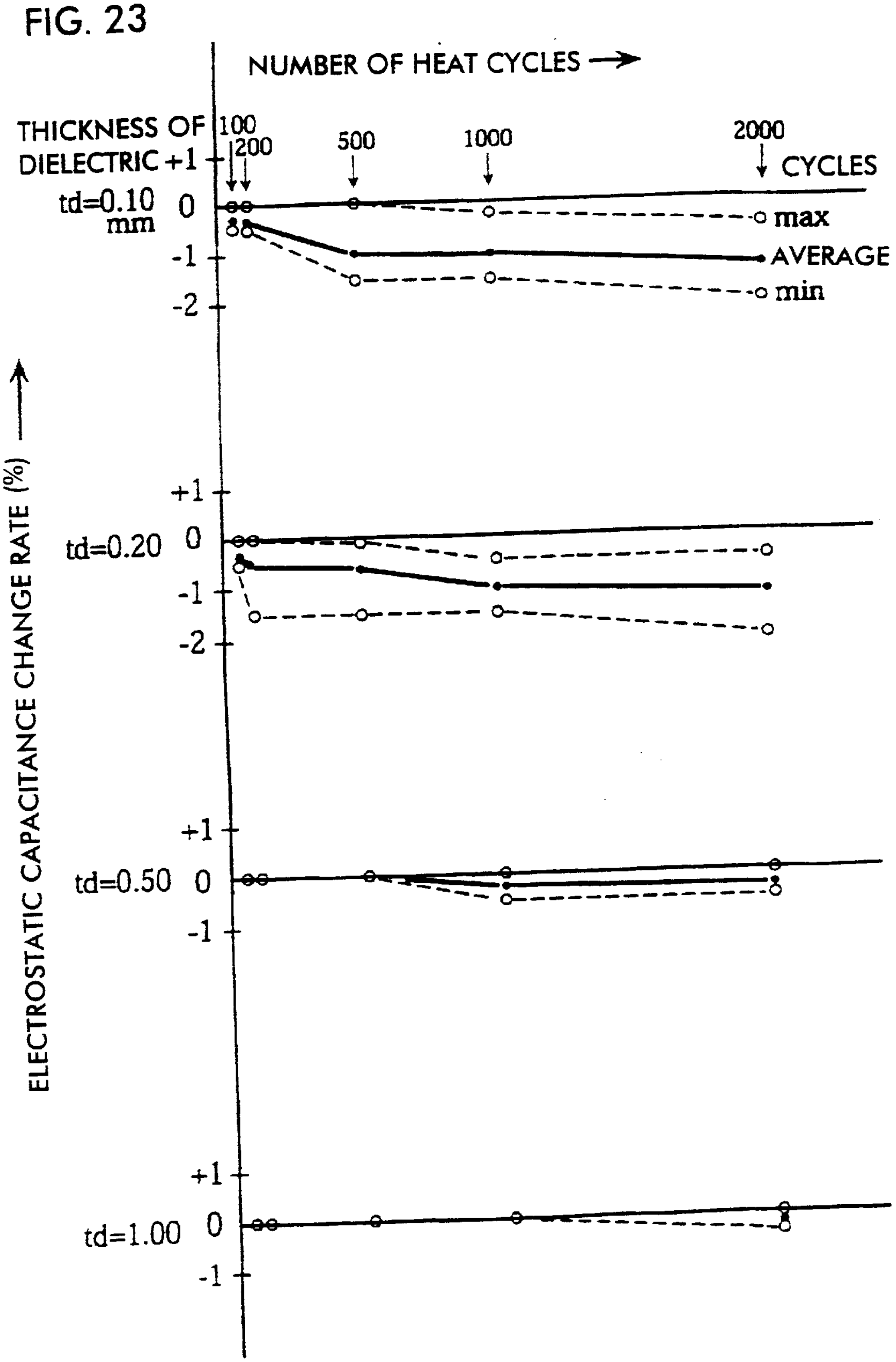
FIG. 23 is a graph showing the relationship between the number of heat cycles of test 1 and the electrostatic capacitance change rate.
Figure 24:
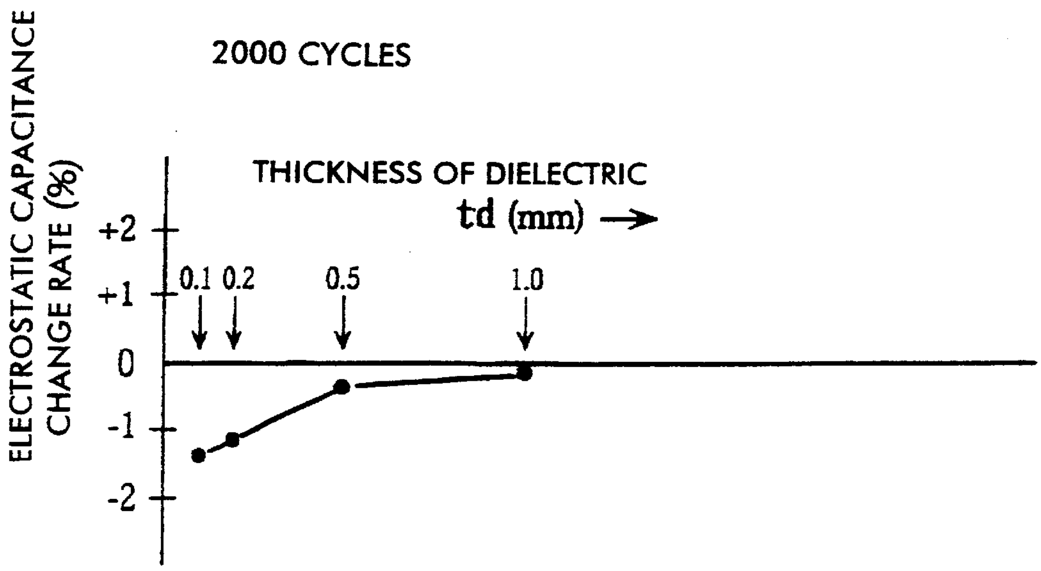
FIG. 24 is a showing the relationship between the electrostatic capacitance change rate of test 1 and the thickness of the dielectric board.
Figure 26:
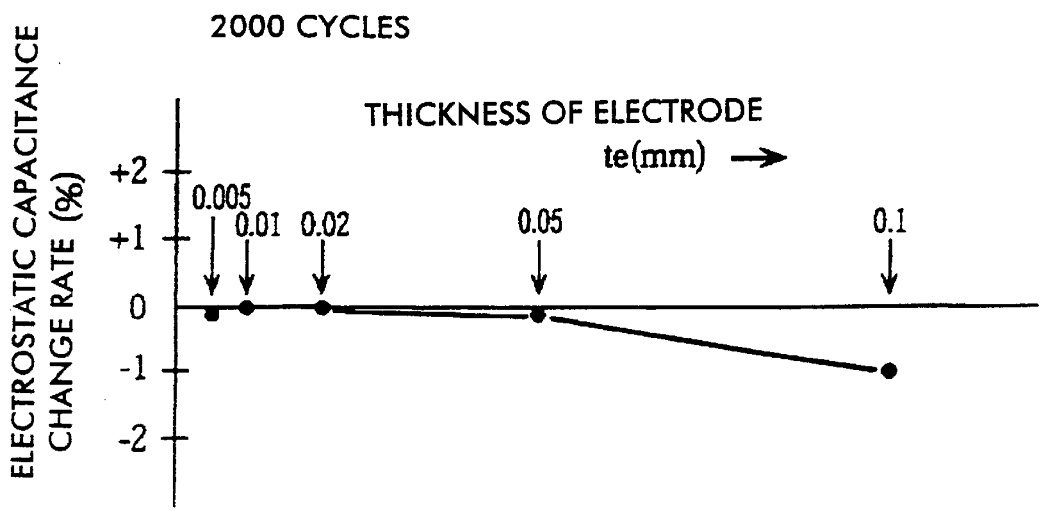
FIG. 26 is a graph showing the relationship between the electrostatic capacitance change rate of test and the thickness of the dielectric board.

FIGS. 23 and 24, and FIGS. 25 and 26 are graphs showing the test results of tests 1 and 2, respectively. In the figures, the ○ marks indicate maximum or minimum values, and the ● marks indicate the average values thereof. FIGS. 24 and 26 are graphs in which the change rate of the electrostatic capacitance value in 2,000 cycles of tests 1 and 2 is summarized, respectively.

As shown in FIGS. 23 and 24, the results of test 1 reveal that, when the substrate thickness td is 0.1 or 0.2 mm, the electrostatic capacitance change rate is as large as −1.4% and −1.2% (see the ● marks in the figure) in terms of average value, which also indicates the occurrence of electrode peeling. Also, when the substrate thickness td is 0.5 or 1.0 mm, the change rate during 2,000 heat cycles is as low as −0.3% and −0.05% in terms of average value. Thus, the larger the substrate thickness td becomes, the more unlikely it is for electrode peeling to occur. However, the capacitor becomes larger by an amount corresponding to an increase in the thickness td of the dielectric substrate D, thus making it impossible to achieve a smaller size of the isolator.

Figure 25:
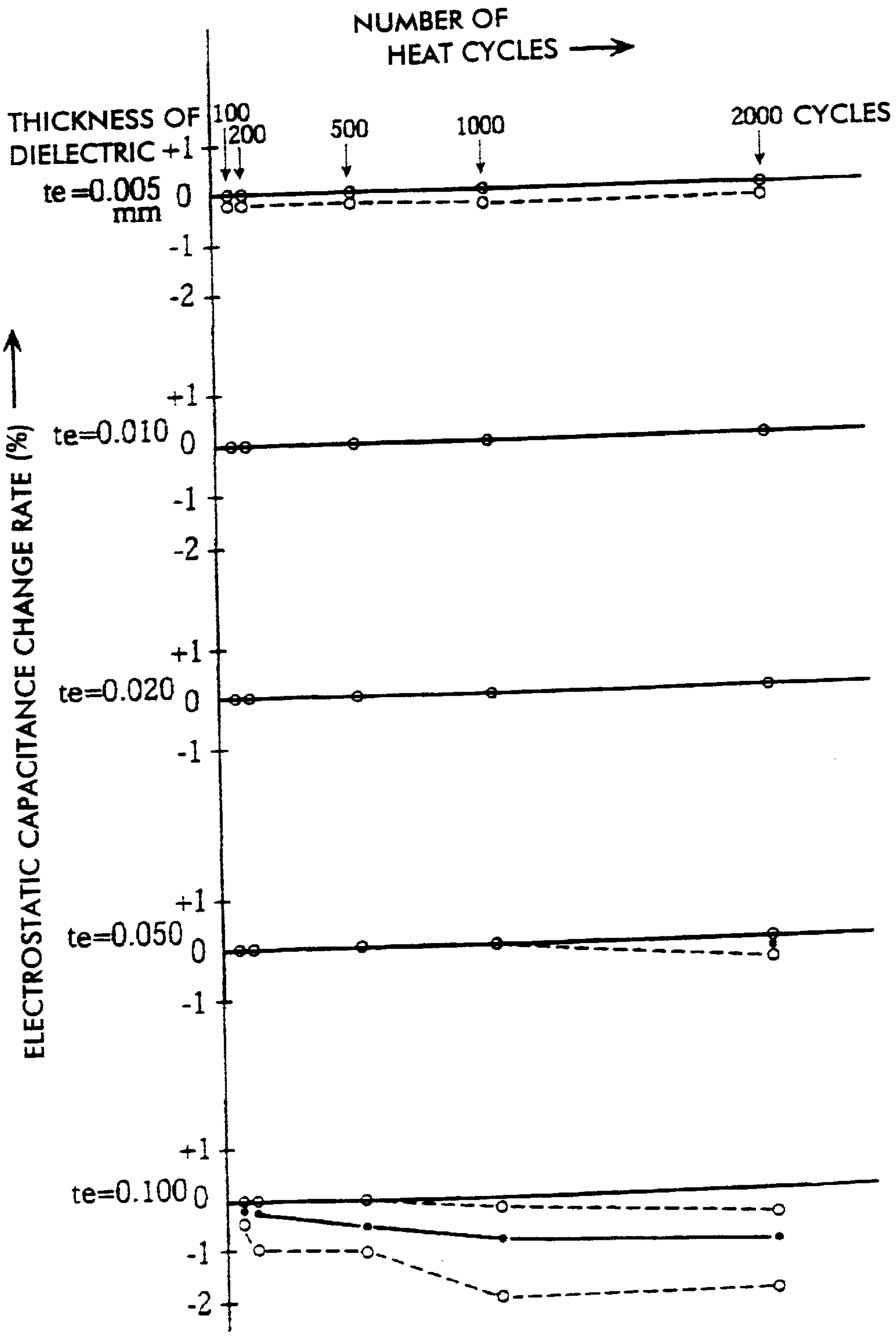
FIG. 25 is a graph showing the relationship between the number of heat cycles of test 2 and the electrostatic capacitance change rate.

In comparison, in the results of test 2, as is clear from FIGS. 25 and 26, in spite of the fact that the thickness td of the dielectric substrate D was as small as 0.2 mm, there is hardly any change in the electrostatic capacitance in the range in which the film thickness te of the capacitor electrode E is 0.005 to 0.05 mm, and electrode peeling has not occurred. As a result, by soldering and connecting the connected electrode (here e.g. to a Cu board) within the outer peripheral edge of the capacitor electrode of the single-board-type capacitor, the dielectric substrate can be formed much thinner than in the conventional case.

Meanwhile, when the film thickness te of the capacitor electrode E is 0.1 mm, the electrostatic capacitance during 2,000 heat cycles changes greatly to −1.0% (see the ● marks in the figure). This becomes nearly the same as that in which the entire surface of the capacitor electrode is soldered to a thick Cu board, and this is considered to cause electrode peeling to easily occur because of the thermal stress resulting from the difference in the thermal expansion coefficients. However, the setting of the film thickness te of the capacitor electrode E at 0.1 mm is difficult in practice in consideration of cost and manufacturing time and labor, because this results in a thickness that is half the thickness td of the dielectric substrate D.

In the manner described above, the results of tests 1 and 2 show that as a result of the thickness td of the dielectric substrate D of the single-board-type capacitor being set to 0.5 mm or less and the film thickness te of the capacitor electrode E being set to 0.05 mm or less, the capacitor can be formed into a smaller size and a thinner shape without causing a problem with electrode peeling, contributing to an even smaller size of the isolator. Specifically, it is preferable that the thickness td of the dielectric substrate D be in a range of 0.1 to 0.5 mm and the film thickness te of the capacitor electrode E be in a range of 0.005 to 0.05 mm.

Although in the above-described embodiments a description is given by using a lumped-constant-type isolator as an example, it is a matter of course that the present invention can be applied to a different nonreciprocal circuit device, such as a circulator.

According to the nonreciprocal circuit device of the present invention, since at least a part of the outer peripheral edge of a connected electrode, to which the cold side of the capacitor electrode of the single-board-type capacitor is connected, is positioned inwardly from the outer peripheral edge of the capacitor electrode, there is the advantage that electrode peeling in the edge portion of the capacitor electrode, in which cracks are likely to occur due to stress concentration and manufacture, can be prevented, and reliability with respect to quality can be improved. Furthermore, since the edge portion of the capacitor electrode is not connected, there is also the advantage that, electrode peeling can be prevented even if thermal stress due to a difference in the thermal expansion coefficients occurs.

In the present invention, when a part of the outer peripheral edge of a connected electrode to be connected to the hot side of the capacitor electrode is also positioned inwardly from the outer peripheral edge of the capacitor electrode, there is the further advantage that electrode peeling can be prevented in the same way as that described above.

In the present invention, when the outer peripheral edge of the connected electrode is positioned inwardly from the outer peripheral edge of the capacitor electrode around the entire periphery of the connected electrode, there is the advantage that electrode peeling can be reliably prevented.

In the present invention, when the capacitor electrode and the connected electrode are formed with a rectangular shape, and the long-side edge of the connected electrode is Positioned inwardly from the long-side edge of the capacitor electrode, there is the advantage that electrode peeling in the transverse direction in which electrode peeling is likely to occur can be prevented, and an electrode area in the longitudinal direction can be increased. Also, there is the advantage that it is possible to deal with a capacitor of a different length.

In the present invention, when a part of the long-side edge of the connected electrode is extended and formed up to the long-side edge of the capacitor electrode, there is the further advantage that the electrode area along the transverse direction can be increased while preventing electrode peeling similarly to that described above.

In the present invention, by coating an insulating film formed from an insulating material onto the non-connected section surrounding of the connected electrode, there is the advantage that electrode peeling can be prevented more reliably.

In the present invention, when the insulating film is formed by printing a resin, there is the further advantage that the insulating film can easily be formed with high accuracy.

In the present invention, when a connected electrode is formed over a solder-dewetting film which forms a base, portions surrounding the connected electrode are covered by the solder-dewetting film. Therefore, there is the advantage that providing the solder-dewetting film around the connected electrode is easy in a case in which the grounding electrode has a complex shape.

In the present invention, when a non-connected section on the outside of a connected electrode is formed by a step-down so as to be spaced away from the outer peripheral edge of the capacitor electrode, the outer peripheral edge of the capacitor electrode can be placed in a non-contact state, yielding the advantage that electrode peeling can be prevented more reliably.

In the present invention, when at least a part of the outer peripheral edge of the capacitor electrode is positioned inwardly from the outer peripheral edge of the dielectric substrate, an electrode in the edge portion of the dielectric substrate, in which cracks are likely to occur due to stress concentration and manufacture, can be eliminated, yielding the advantage that electrode peeling can be prevented.

In the present invention, when the capacitor electrode is formed by printing, there is the advantage that a non-connected section around the edge of the dielectric substrate can be easily formed, In the present invention, when the outer peripheral edge of the capacitor electrode is removed by etching, there is the advantage that a non-connected section can be easily formed.

In the present invention, when a single-board-type capacitor is manufactured in such a way that electrodes are pattern-formed on both main surfaces of a dielectric motherboard in such a manner as to be opposed each other with the motherboard in between, and the motherboard is cut to predetermined dimensions, manufacturing becomes easy and mass production is possible, yielding the advantage that the costs of parts can be reduced, and a wasteful increase in area and in weight can be eliminated, contributing to a smaller size and a lighter weight.

In the present invention, when a single-board-type capacitor and a grounding member with the connected electrode formed thereon, are assembled integrally, there is the advantage that electrode peeling can be prevented to improve reliability with respect to quality, unwanted radiation can be reduced, and harmonic wave elimination performance can be improved.

In the present invention, when the thickness of the dielectric substrate of the single-board-type capacitor is 0.5 mm or less, the entire capacitor can be formed smaller and thinner without causing a problem with electrode peeling, thereby contributing to an even smaller size of the isolator.

In the present invention, when the film thickness of the capacitor electrode of the single-board-type capacitor is 0.05 mm, there is the advantage that the problem with electrode peeling when the thickness of the dielectric substrate is 0.5 mm or less can be prevented more reliably.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. A method of manufacturing a nonreciprocal circuit device having characteristics such that attenuation is small in a direction of signal transmission and attenuation is large in a direction that is opposite to the direction of signal transmission and having matching capacitors disposed in signal input/output ports, said method comprising the steps of:

forming said matching capacitors of single-board-type capacitors, each including a pair of capacitor electrodes formed on a dielectric substrate having two main surfaces and edges extending between said two main surfaces such that the pair of capacitor electrodes are formed on the respective entire main surfaces of the dielectric substrate with the dielectric substrate in between, so as to oppose each other;

positioning said matching capacitors and a ground electrode in a housing; and positioning at least a long-side edge of an outer peripheral edge of said ground electrode, to which a cold side of one of said capacitor electrodes of the single-board-type capacitor is connected, inwardly from an outer peripheral edge of said cold side of said one of said capacitor electrodes so that a portion of the long-side edge of the outer peripheral edge of the ground electrode closest to a side of the housing does not contact the side of the housing.

2. The method of manufacturing a nonreciprocal circuit device according to claim 1, further comprising the step of positioning the outer peripheral edge of said ground electrode inwardly from the outer peripheral edge of the capacitor electrode around the entire periphery of said ground electrode.

3. The method of manufacturing a nonreciprocal circuit device according to claim 1, further comprising the steps of forming said capacitor electrode and said ground electrode so as to be rectangular in shape, and positioning the long-side edge of the ground electrode inwardly from a corresponding long-side edge of the capacitor electrode.

4. The method of manufacturing a nonreciprocal circuit device according to claim 3, further comprising the step of forming part of the long-side edge of said ground electrode so as to extend to a corresponding long-side edge of the capacitor electrode.

5. The method of manufacturing a nonreciprocal circuit device according to claim 1, further comprising the step of covering a non-connected section of said nonreciprocal circuit device surrounding said ground electrode with an insulating film made from an insulating material.

6. The method of manufacturing a nonreciprocal circuit device according to claim 5, wherein said insulating film is made from a resin.

7. The method of manufacturing a nonreciprocal circuit device according to claim 6, further comprising the step of forming said insulating film by printing said resin.

8. The method of manufacturing a nonreciprocal circuit device according to claim 5, further comprising the step of forming a solder-dewetting film as a base under said ground electrode.

9. A method of manufacturing a nonreciprocal circuit device having characteristics such that attenuation is small in a direction of signal transmission and attenuation is large in a direction that is opposite to the direction of signal transmission and having matching capacitors disposed in signal input/output ports, said method comprising the steps of:

forming said matching capacitors of single-board-type capacitors, each including a pair of capacitor electrodes formed on a dielectric substrate having two main surfaces and edges extending between said two main surfaces such that the pair of capacitor electrodes are formed on the respective entire main surfaces of the dielectric substrate with the dielectric substrate in between, so as to oppose each other;

positioning said matching capacitors and a port in a housing; and positioning at least a long-side edge of an outer peripheral edge of said port, to which a cold side of one of said capacitor electrodes of the single-board-type capacitor is connected, inwardly from an outer peripheral edge of said hot side of said one of said capacitor electrodes so that a portion of the long-side edge of the outer peripheral edge of the port closest to a side of the housing does not contact the side of the housing.

10. The method of manufacturing a nonreciprocal circuit device according to claim 9, further comprising the step of positioning the outer peripheral edge of said port inwardly from the outer peripheral edge of the capacitor electrode around the entire periphery of said port.

11. The method of manufacturing a nonreciprocal circuit device according to claim 9, further comprising the steps of forming said capacitor electrode and said port so as to be rectangular in shape, and positioning the long-side edge of the port inwardly from a corresponding long-side edge of the capacitor electrode.

12. The method of manufacturing a nonreciprocal circuit device according to claim 11, further comprising the step of forming part of the long-side edge of said port so as to extend to a corresponding long-side edge of the capacitor electrode.

13. The method of manufacturing a nonreciprocal circuit device according to claim 9, further comprising the step of covering a non-connected section of said nonreciprocal circuit device surrounding said port with an insulating film made from an insulating material.

14. The method of manufacturing a nonreciprocal circuit device according to claim 13, wherein said insulating film is made from a resin.

15. The method of manufacturing a nonreciprocal circuit device according to claim 14, further comprising the step of forming said insulating film by printing said resin.

16. The method of manufacturing a nonreciprocal circuit device according to claim 13, further comprising the step of forming a solder-dewetting film as a base under said port.

17. A method of manufacturing a nonreciprocal circuit device having characteristics such that attenuation is small in a direction of signal transmission and attenuation is large in a direction that is opposite to the direction of signal transmission and having matching capacitors disposed in signal input/output ports, said method comprising the steps of:

forming said matching capacitors of single-board-type capacitors, each including a pair of capacitor electrodes formed on a dielectric substrate having two main surfaces and edges extending between said two main surfaces such that the pair of capacitor electrodes are formed on the respective main surfaces of the dielectric substrate with the dielectric substrate in between so as to oppose each other; and forming at least a part of an outer peripheral edge of one of said capacitor electrodes in such a manner as to be positioned inwardly from a corresponding outer peripheral edge of said dielectric substrate.

18. The method of manufacturing a nonreciprocal circuit device according to claim 17, further comprising the step of forming said one of said capacitor electrodes by printing.

19. The method of manufacturing a nonreciprocal circuit device according to claim 17, further comprising the step of etching a portion of the single-board-type capacitors around the outer peripheral edge of said capacitor electrode to remove at least a part of the outer peripheral edge of said one of said capacitor electrodes.

20. A method of manufacturing a nonreciprocal circuit device having characteristics such that attenuation is small in a direction of signal transmission and attenuation is large in a direction that is opposite to the direction of signal transmission and having matching capacitors disposed in signal input/output ports, said method comprising the steps of:

forming said matching capacitors of single-board-type capacitors, each including a pair of capacitor electrodes formed on a dielectric substrate having two main surfaces and edges extending between said two main surfaces such that the pair of capacitor electrodes are formed on the respective entire main surfaces of the dielectric substrate with the dielectric substrate in between, so as to oppose each other;

positioning at least a part of an outer peripheral edge of a ground electrode, to which a cold side of one of said capacitor electrodes of the single-board-type capacitor is connected, inwardly from an outer peripheral edge of said cold side of said one of said capacitor electrodes; and forming a non-connected section of said nonreciprocal circuit device surrounding said ground electrode in the form of a step spaced away from the outer peripheral edge of the capacitor electrode.

21. A method of manufacturing a nonreciprocal circuit device having characteristics such that attenuation is small in a direction of signal transmission and attenuation is large in a direction that is opposite to the direction of signal transmission and having matching capacitors disposed in signal input/output ports, said method comprising the steps of:

forming said matching capacitors of single-board-type capacitors, each including a pair of capacitor electrodes formed on a dielectric substrate having two main surfaces and edges extending between said two main surfaces such that the pair of capacitor electrodes are formed on the respective entire main surfaces of the dielectric substrate with the dielectric substrate in between, so as to oppose each other;

positioning at least a part of an outer peripheral edge of a port, to which a hot side of one of said capacitor electrodes of the single-board-type capacitor is connected, inwardly from an outer peripheral edge of said hot side of said one of said capacitor electrodes; and forming a non-connected section of said nonreciprocal circuit device surrounding said port in the form of a step spaced away from the outer peripheral edge of the capacitor electrode.

22. The method of manufacturing a nonreciprocal circuit device according to any one of claims 1, 9 and 17, further comprising the step of making said dielectric substrate of said single-board-type capacitor about 0.5 mm or less in thickness.

23. The method of manufacturing a nonreciprocal circuit device according to claim 22, further comprising the step of making said capacitor electrode of said single-board-type capacitor about 0.05 mm or less in thickness.

24. The method of manufacturing a nonreciprocal circuit device according to any one of claims 1, 9 and 17, further comprising the step of making said capacitor electrode of said single-board-type capacitor about 0.05 mm or less in thickness.

25. The method of manufacturing a nonreciprocal circuit device according to any one of claims 1, 9 and 17, wherein the step of forming said matching capacitors of single-board-type capacitors includes the steps of forming said single-board-type capacitors by pattern-forming electrodes on both of two opposed main surfaces of a dielectric motherboard with the motherboard in between, and cutting the motherboard to predetermined dimensions to define said single-board-type capacitors.

26. The method of manufacturing a nonreciprocal circuit device according to any one of claims 1 or 20 further comprising the step of forming each said single-board-type capacitor integrally with a grounding member having said ground electrode formed thereon.

* * * * *